United States Patent [19]

Saylor et al.

[11] 4,391,300
[45] Jul. 5, 1983

[54] PIPE PATCHING CLAMP

[75] Inventors: Arthur D. Saylor, Covina; Henry L. Habegger, Anaheim, both of Calif.

[73] Assignee: Habegger International, Pasadena, Calif.

[21] Appl. No.: 182,942

[22] Filed: Sep. 2, 1980

[51] Int. Cl.³ ............................................. F16L 55/16
[52] U.S. Cl. ..................................................... 138/99
[58] Field of Search ...................... 138/99, 97; 24/278, 24/21

[56] References Cited

U.S. PATENT DOCUMENTS

| | | | |
|---|---|---|---|
| 1,559,442 | 10/1925 | Lacy | 138/99 |
| 1,806,867 | 5/1931 | Welsh | 138/99 |
| 2,429,411 | 11/1950 | Northrup | 138/99 |

*Primary Examiner*—Robert I. Smith

[57] ABSTRACT

A patch clamp for repairing holes and splits or cracks in pipes that convey liquids or gases having a unitary, cylindrical strap adapted to surround the pipe with a pair of opposed, interconnectable dogs forming the opposite ends thereof. The strap also includes two pairs of longitudinally extending grooves in the inner surface thereof located at substantially 180 degrees from one another. A resilient sealing strip to be positioned between the strap and the pipe against the hole or split to be repaired has one side conforming to the inner surface of the strap member and two spaced tongues having the same cross-sectional shapes as in one pair of the grooves in the strap member to form an interlocking connection therebetween. The other side of the strip has a convex surface facing the pipe which is compressed between the strap member and the pipe upon securing the dogs together by a threaded member.

8 Claims, 4 Drawing Figures

PIPE PATCHING CLAMP

The present invention relates generally to a pipe patching clamp and, more particularly, to a pipe patching clamp for use in repairing holes, splits or cracks in pipes that convey liquids or gases.

BACKGROUND OF THE INVENTION

Many industries use pipes or pipe lines for conveying liquids and gases. Leaks that occur in such pipes or pipe lines generally take two forms, holes and longitudinally extending splits or cracks, with it being unusual for diagonal or transverse splits to occur.

A number of different types of pipe patching clamps have been developed for use by industry in repairing leaks in pipe lines while such pipe lines remain in service, the most common type incorporating a stainless steel strap or clamp with two cast iron dogs that hold a cinching bolt. A circular rubber disc or piece of rolled rubber is placed over the leak and the clamp is then cinched tightly thereover. Among other disadvantages, since the clamp is metallic, it could produce a spark when contacting the metallic pipe, which could be very dangerous if working with gas lines, for example, and, as well, is subject to deterioration by corrosion.

Other types of pipe clamps are known, such as those described in U.S. Pat. Nos. 1,928,570; 2,009,046; 2,977,995; 3,151,631; and 3,432,188. However, these and the other types of pipe clamps that are known are complex, costly, inconvenient to use, can only be used to repair holes or splits but not both, or present metal-to-metal connections with the accompanying corrosion problem.

SUMMARY OF THE INVENTION

According to the present invention, there is provided a pipe patching clamp for use in repairing either holes or longitudinal splits or cracks in pipes or pipe lines which is simple in construction and easy to use so that a repair may be made under the most difficult circumstances, in a minimum of time, and in close quarters. There are no metal-to-metal arrangements thereby obviating problems from corrosion or the possibility of fire and explosion caused by spark generation.

The described patching clamp includes a unitary, cylindrical strap adapted to surround the pipe and having a pair of opposed, interconnectable dogs forming the opposite ends thereof. Two pairs of longitudinally extending grooves are formed in the strap inner surface, each pair being located at substantially 180 degrees from the other. A sealing strip, made from a resilient material, is adapted to be positioned between the strap and the pipe, against the hole or split to be repaired. One side of the strip is curved to conform to the inner surface of the strap member and includes a pair of integral, spaced tongues having the same cross-sectional shapes as the pair of grooves in the strap member to form an interlocking connection therebetween. The other side of the strip presents a convex surface to the pipe which is compressed between the strap member and the pipe in use.

In construction, the strap member is preferably cast from a synthetic plastic material which is sufficiently resilient to enable the strap to be placed on a pipe and has such characteristics that when so positioned it will tend to clamp itself about the pipe.

OBJECTS OF THE INVENTION

It is therefore an object of the present invention to provide an improved pipe patching clamp.

It is a further object of the present invention to provide an improved pipe patching clamp for repairing holes and longitudinal splits or cracks in pipes.

It is a still further object of the present invention to provide a pipe patching clamp which is simple and convenient to use.

A still further object of the present invention is to provide a pipe patching clamp which may be applied in a minimum amount of time and by one person.

Yet another object of this invention is to provide a pipe patching clamp in which there are no metal-to-metal connections.

DESCRIPTION OF THE PREFERRED EMBODIMENTS

Figure 1:
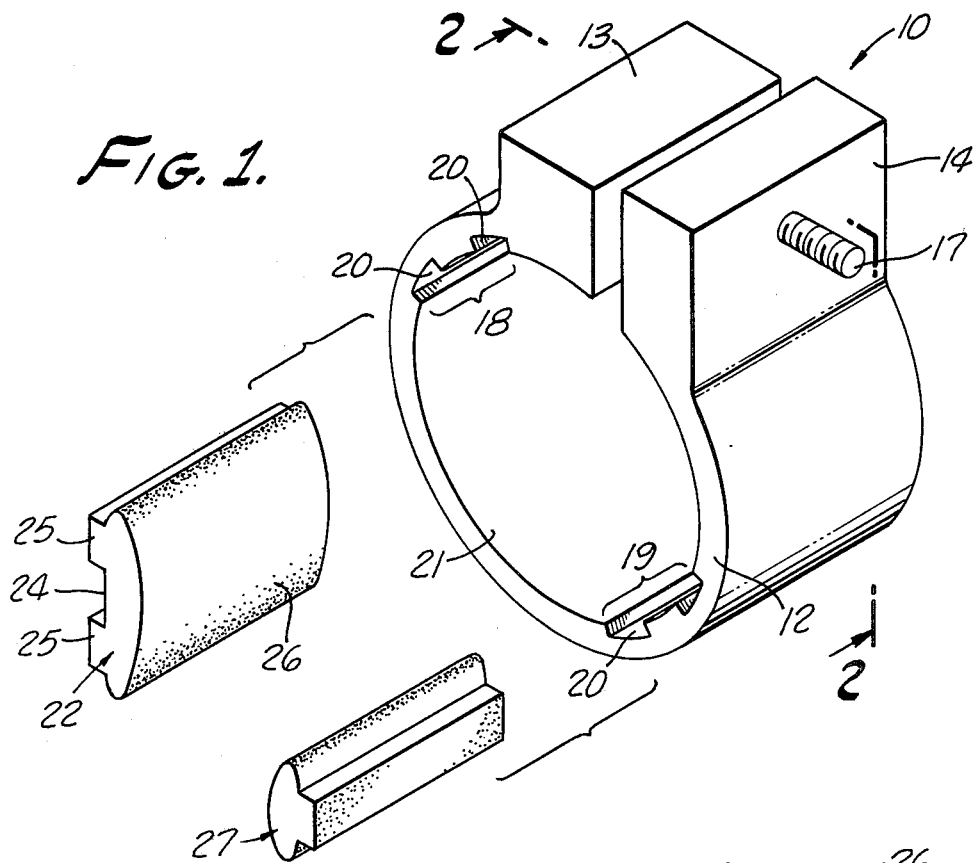
FIG. 1 is a perspective view of a pipe patching clamp constructed in accordance with the present invention.
Figure 2:
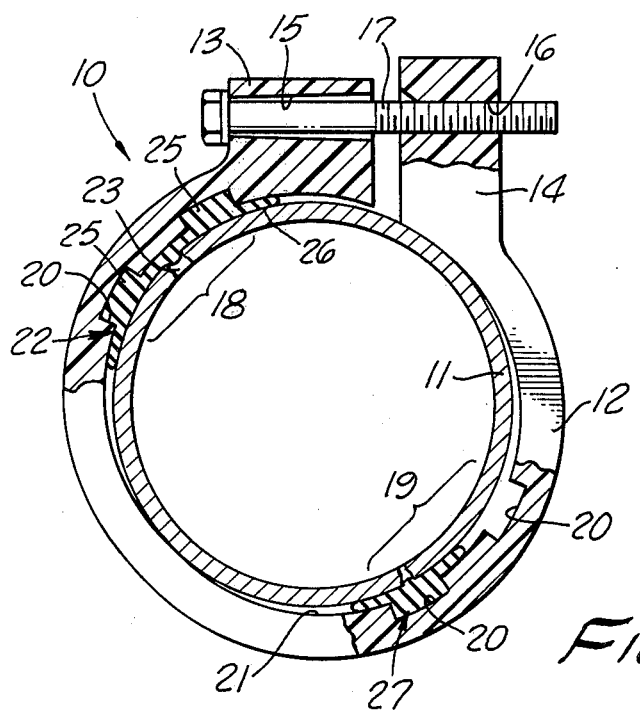
FIG. 2 is a sectional elevational view taken along the line 2—2 of FIG. 1.

Referring now to the drawings, and, particularly FIGS. 1 and 2, there is shown a pipe patching clamp, enumerated generally as at 10, for repairing holes and/or longitudinal splits or cracks in pipes, such as a pipe 11. The patching clamp 10 includes a unitary strap 12 adapted to surround the pipe 11 forming a cylindrical member having an internal diameter approximately equal to the external diameter of pipe 11. The strap 12 is preferably a one-piece member molded entirely from a synthetic plastic material so as to obviate the possibility of corrosion from a metal-to-metal connection between the strap and pipe 11, and which could also, through the production of electrical sparks, result in fire or explosion.

As shown most clearly in FIGS. 1 and 2, strap 12 includes a pair of integral, opposed dogs 13 and 14 formed at opposite ends thereof for use in securing strap 12 to pipe 11. That is, dog 13 has an opening 15 therein aligned with a threaded opening 16 in dog 14, the opening being tapered from a relatively large diameter at the closest to dog 14 and a smaller diameter at the opposite end of the opening. In assembly, a non-metallic bolt 17 extends through the holes 15 and 16 with securement effected by the threaded relation within 16. Preferably the bolt 17 is cast from urethane or nylon, either of which has sufficient strength to secure the strap in place about the pipe and has a diameter such that there is a clearance of 0.030 inches with respect to the walls of the opening 15 adjacent the bolt head and a clearance of 0.060 inches at the opposite end of the opening. The clearance between the bolt and the tapered walls defining the opening 15 enable ready threaded engagement of the bolt within the dog 14 without alignment difficulties.

Strap 12 has two sets 18 and 19 of circumferentially spaced grooves 20 in the inner surface 21 extending parallel to the cylindrical axis thereeof. As seen most clearly in FIG. 2, each set 18 and 19 includes a pair of grooves, with the set 18 being located at approximately 45 degrees from the dog 13 and the set of grooves 19 arranged at substantially 180 degrees from 18. Each groove 20 is substantially rectangular in cross-section with the total circumferential angular extent for one set or pair of grooves approximating 45 degrees which is considered a practical optimum. With the two sets of grooves located as described, this insures that when one of the sets is located opposite a pipe crack to be patched, the bolt 17 can always be located above the pipe and readily accessible.

Pipe patching clamp 10 further includes an elongated sealing strip 22 made from a resilient material, such as rubber, artificial rubber, or synthetic plastic. The strip 22 is positioned between the strap 12 and pipe 11 over either a hole, split or crack, such as at 23 and with parts located in both grooves of one of the sets of grooves. By entirely covering split or crack 23, the action of strap 12 in compressing sealing strip 22 against pipe 11, seals the crack to prevent fluid carried by the pipe from escaping.

Since the crack or split 23 may have any length and, particularly, a length greater than the width of a single strap 12, the sealing strip 22 is provided in a reel or coil so that any desired length thereof may be cut off. In this case, more than one strap 12 may be used to hold the sealing strip compressingly against the crack.

Figure 3:
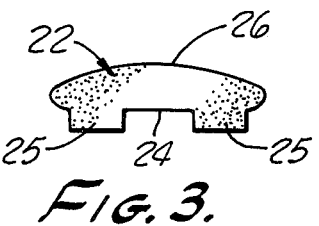
FIG. 3 is an enlarged, sectional, elevational view of a sealing strip.

As shown most clearly in FIG. 3, one side 24 of sealing strip 22 conforms generally to the inner circular surface 21 of strap 12 and includes integral therewith a pair of laterally spaced, longitudinally extending tongues 25, the spacing between the tongues being equal to the spacing between adjacent grooves 20 in a given set pair. Furthermore, the cross-sectional shape of each tongue 25 is identical to that of grooves 20, permitting their ready receipt within the grooves. The other side 26 of sealing strip 22 is convexly curved so that the spacing between sides 24 and 26, at the central portions thereof, is substantially greater in the relaxed condition of the strip, as shown in FIG. 3, than in the compressed condition thereof, as shown in FIG. 2.

Because of the inclusion of tongues 25, an interlocking connection is achieved between strap 12 and sealing strip 22. That is, sealing strip 22 may be initially located circumferentially relative to the strap until tongues 25 engage the selected pair of grooves 20. Then, sealing strip 22 is slid longitudinally into the associated grooves of the strap to form an interlocking connection. Because of this interlocking connection, and with the strap positioned on the pipe 11, circumferential and longitudinal adjustment of the strap will automatically adjust the sealing strip accordingly.

After properly locating the sealing strip over the crack 23 and within the strap grooves, the bolt 17 is passed through the hole 15 in dog 13 and threaded into 16 until the patch is complete.

The selection of the synthetic plastic for constructing the strap is of fundamental importance in that it must be sufficiently resilient to enable the strap being placed on the pipe without losing its structural integrity. Best results have been obtained with a polyester based, thermosetting urethane sold under the registered trademark RIMTHANE 2136 by the CPR Division of The Upjohn Company, Torrance, Calif. Preferably this material should have a Shore "D" hardness of 70 which provides sufficient rigidity and strength for withstanding the torques and stresses of mounting onto a pipe as well as the continuous clamping stress during use. Where the outer diameter of the pipe to be repaired is in the range of 3-8 inches (7.6-20.3 cm) and the length of the strap 12 along its cylindrical axis is not more than about 2 inches (5 cm), a hardness is excellent. However, on exceeding 2 inches in length for that diameter range at a hardness of 70, the material is too difficult to open for receipt over the pipe by, say, one person. Similarly, for small pipe diameters of 2 inches or less (5 cms or less) the hardness should be reduced to a Shore "D" of 50. The bolt is preferably maintained at a Shore "D" hardness of 60.

It can therefore be seen that according to the present invention, a pipe patching clamp 10 is provided for repairing either holes or longitudinal splits or cracks in pipes. The described clamp is simple in construction and easy to use so that a repair may be made under the most difficult circumstances and in a minimum of time. None of the parts are made of metal which could create a dangerous spark if struck against metallic pipes. Also, with no metal parts deterioration from electrolytic corrosion is obviated.

Because sealing strip 22 may be provided in a reel or coil, it can be used to seal any length of longitudinal split. The one making the repair merely cuts off only what the leak requires, thereby eliminating waste. Preferably, the sealing strip has an overall length slightly longer than the clamp length (e.g., 0.25 inches; 0.64 cm). This extra length facilitates locating the sealing strip over the hole, crack, or split.

Figure 4:
FIG. 4 is an enlarged, sectional, elevational view of an alternate version of a sealing strip.

Turning now to FIG. 4, an alternate form of the invention for sealing relatively small fissures in a pipe is depicted. The sealing strip 27 is similar to the strip 22 previously described, except that it has a single tongue for fitting receipt within one groove 20. As in the first described embodiment, the surface of the sealing strip 27 is convexly curved toward the pipe.

In the practice of this invention, there is provided a clamp for application onto a pipe in situ to seal a hole, crack or split in the pipe. The clamp may be applied onto the pipe and tightened into final sealing relation by one individual. The main body of the clamp may be readily made to any desired length as measured along the cylindrical axis and thereby effective for repairing longitudinal pipe cracks or splits of considerable extent. However, in practical applications if the clamp body length is too great, it is difficult to open for receipt onto the pipe. Therefore, for relatively long longitudinal splits or cracks it is advisable to use multiple clamps with a single sealing strip over splits or cracks. Since the clamp body and bolt are both constructed of a non-metallic material, the possibility of fire or explosion resulting from sparks being struck during assembly, for example, is obviated.

We claim:

1. A pipe patching clamp for repairing fissures in pipes in situ, comprising:

a one-piece non-metallic strap member formed into a cylinder and having a pair of dogs forming the respective opposite ends, said member being sufficiently resilient to enable separation of the member ends and receipt of the member about a pipe with inherent resiliency urging the strap member ends toward one another;

first and second longitudinally extending grooves on the member inner surface, the base of each groove and the groove opening at the strap member surface being of substantially same dimensions, said grooves being located at approximately 180 degrees to each other;

threaded means for securing the strap member dogs together and hold the strap member about the pipe; and a sealing strip of a resilient material, one side of the strip curved to conform to the inner surface of said strap member and including at least one integral tongue of such geometry enabling fitting receipt within a groove, the other side of said strip extending outwardly of the inner surface of the strap member.

2. A pipe patching clamp according to claim 1, in which one dog has an oversize opening and the other dog has a threaded opening somewhat aligned with the oversize opening, and said threaded means passes through the oversize opening and is secured within said threaded opening.

3. A pipe patching clamp according to either of claims 1 or 2, wherein said strip is made from a rubber material.

4. A pipe patching clamp according to either of claims 1 or 2, wherein said sealing strip is arranged in a continuous coil and cut to desired length for sealing a longitudinal split in a pipe and wherein a plurality of said strap members may be positioned in parallel, spaced relationship to support any desired length of sealing strip.

5. A pipe patching clamp as in claim 2, in which the oversize opening is tapered along its axis, the large part of the opening being adjacent the other dog.

6. A pipe patching clamp as in claim 1, in which the strap member is constructed of a molded synthetic plastic having a Shore "D" hardness in the range of 50–70, and the threaded means is constructed of a synthetic plastic material.

7. A pipe patching clamp as in claim 6, in which said plastic is a thermosetting urethane.

8. A pipe patching clamp for repairing holes or cracks in pipes, comprising:

a one-piece strap member formed into a cylinder with its opposing ends forming a pair of dogs, said member being sufficiently resilient to enable separation of the member ends and receipt of the member about a pipe with the inherent resiliency urging the strap member ends toward one another;

a first pair of circumferentially spaced, longitudinally extending grooves on the member inner surface, the grooves being substantially rectangular in cross-section;

a second pair of circumferentially spaced, longitudinally extending grooves on the member inner surface, the grooves being substantially rectangular in cross-section, said second pair of grooves being located on the member at substantially 180 degrees from the first pair of grooves;

non-metallic means for releasably securing the strap member dogs together to clamp the strap member about the pipe; and a resilient sealing strip received within at least one groove, the other side of said strip extending outwardly of the inner surface of the strap member.

* * * * *